United States Patent [19]

Verbiest et al.

[11] Patent Number: 5,550,577
[45] Date of Patent: Aug. 27, 1996

[54] VIDEO ON DEMAND NETWORK, INCLUDING A CENTRAL VIDEO SERVER AND DISTRIBUTED VIDEO SERVERS WITH RANDOM ACCESS READ/WRITE MEMORIES

[75] Inventors: Willem J. A. Verbiest, Sint Gillis Waas; Bart F. Voeten, Beerse; Christophe D. G. Vermeulen, Ramegnies-Chin; Frank O. Van der Putten, Lede; Frank C. M. Defoort, Aartselaar, all of Belgium

[73] Assignee: Alcatel N.V., Rijswijk, Netherlands

[21] Appl. No.: 246,180

[22] Filed: May 19, 1994

[30] Foreign Application Priority Data

May 19, 1993 [EP] European Pat. Off. ............. 93870084

[51] Int. Cl.⁶ .............................. H04N 7/10; H04N 7/14; H04N 7/173
[52] U.S. Cl. .................. 348/7; 348/10; 348/13; 455/4.1; 455/5.1
[58] Field of Search ..................... 348/7, 10, 13; 455/4.1, 4.2, 5.1, 6.1; 395/934, 600, 425; 364/403; H04N 7/10, 7/14, 7/15, 7/16, 7/173, 7/18

[56] References Cited

U.S. PATENT DOCUMENTS

| | | | |
|---|---|---|---|
| 4,638,381 | 1/1987 | Vaughn | 360/51 |
| 4,647,986 | 3/1987 | Vaughn et al. | 360/35.1 |
| 4,674,064 | 6/1987 | Vaughn | 364/900 |
| 4,688,106 | 8/1987 | Keller et al. | 358/342 |
| 4,797,755 | 1/1989 | Baldwin et al. | 360/49 |
| 4,987,489 | 1/1991 | Hurley et al. | 358/105 |
| 5,132,992 | 7/1992 | Yurt et al. | 348/7 |
| 5,133,079 | 7/1992 | Ballantyne et al. | 348/10 |
| 5,161,221 | 11/1992 | Van Nostrand | 395/425 |
| 5,172,413 | 12/1992 | Bradley et al. | 455/6.1 |
| 5,214,639 | 5/1993 | Henrion | 370/60 |
| 5,396,339 | 3/1995 | Stern et al. | 358/342 |
| 5,418,713 | 5/1995 | Allen | 364/403 |

FOREIGN PATENT DOCUMENTS

| | | |
|---|---|---|
| 0446493 | 9/1991 | European Pat. Off. . |
| 0529864 | 3/1993 | European Pat. Off. ........ G06F 15/16 |
| 93870083 | 5/1993 | European Pat. Off. . |
| 0544975 | 6/1993 | European Pat. Off. . |
| 3633165 | 4/1987 | Germany ..................... G06F 13/12 |
| 2248322 | 4/1992 | United Kingdom ............. G11C 7/00 |
| 9007184 | 6/1990 | WIPO ............................ G11C 7/00 |
| 9102420 | 2/1991 | WIPO . |
| 9211713 | 7/1992 | WIPO ........................... H04N 7/167 |

OTHER PUBLICATIONS

"Architectural Design of On–Demand Video Delivery Systems: The Spatio–Temporal Storage Allocation Problem", R. Ramarao et al, *Proc. ICC '91*, Jun. 1991, Denver, pp. 506–511.

(List continued on next page.)

*Primary Examiner*—Safet Metjahic
*Attorney, Agent, or Firm*—Ware, Fressola, Van Der Sluys & Adolphson

[57] ABSTRACT

A video on demand network (VODN), transmits video signals (VS) to user stations (US11, . . . , US2N) pursuant to the receipt of control signals (CS) issued by these user stations. In order to optimize the retrieval costs, this video on demand network maintains a large video library in a central video server (CS) and stores locally popular video signals in a plurality of local distributed video servers (DS1/2) from which the latter video signals are transmitted to the user stations. The video signals provided by the local distributed servers are updated from the central server based upon the changing popularity of the video signals. The present invention proposes in particular to store the video signals in the local distributed servers in random access read/write memories (HDA), e.g., electronic RAMs, magnetic or optical disks, and/or the like, from which the video signals can flexibly be supplied on-line to the user stations and to store the video signals in the central server in sequential access memories, e.g. Digital Audio Tapes (DAT) and CD-ROMs (CDR), providing cheap mass storage.

13 Claims, 5 Drawing Sheets

OTHER PUBLICATIONS

"A Store–and–Forward Architecture for Video–on–Demand Services", A. Gelman et al, *Proc. ICC '91*, Jun. 1991, Denver, pp. 842–846.

"Application of the Multipath Self–Routing Switch in a Combined STM/ATM Cross–Connect System", B. Pauwels et al, *International Switching Symposium*, 1992, Yokohama, pp. 1–13.

"System Architecture for a Large Scale Video on Demand Service", W. Sincoskie, *Computer Networks and ISDN Systems* 22, (1991), pp. 155–162.

"A Multi–Ported Memory Array Optimized for Sequential Transfers", Anonymous Research Disclosure 33089, (1991) Oct., No. 330, Emsworth, GB, p. 1.

"Strength (and Safety) in Numbers", M. Anderson, *Byte*, Dec. 1990, pp. 337–339.

"Maximizing Performance in a Striped Disk Array", P. Chen et al, *Proc. 17th Annual Int'l Symposium on Computer Architecture*, May 1990, Seattle, pp. 322–331.

"DataMesh—Parallel Storage Systems for the 1990s", J. Wilkes, *11th IEEE Symposium on Mass Storage Systems*, Oct. 1991, Monterey CA, pp. 131–136.

"Hierarchical Distribution of Video with Dynamic Port Allocation", T. Yum, *IEEE Transactions on Communications*, vol. 39, No. 8, Aug. 1991, pp. 1268–1274.

VODN

VIDEO ON DEMAND NETWORK, INCLUDING A CENTRAL VIDEO SERVER AND DISTRIBUTED VIDEO SERVERS WITH RANDOM ACCESS READ/WRITE MEMORIES

TECHNICAL FIELD

The present invention relates to a video on demand network for transmitting video signals to user stations and including at least one central video server storing a first plurality of video signals, and a plurality of distributed video servers each storing a second plurality of video signals and transmitting video signals of said second plurality to said user stations pursuant to the receipt of control signals issued by said,user stations, said central server transmitting video signals of said first plurality to said distributed video servers in order to adapt said second pluralities based on said control signals.

BACKGROUND OF THE INVENTION

Such a network is already known in the art, e.g. from the paper "Architectural design of on-demand video delivery systems: the spatio-temporal storage allocation problem", by R. Ramarao et al., Proc. ICC '91, June 1991, pp. 506–511.

In the latter paper it is explained that the video on demand service cannot be efficiently provided by a single central server since the retrieval costs of the video signals are in that case prohibitively large. Indeed, in providing the service via this single central server to geographically distributed user stations clearly resources are wasted in transmitting the video signals over long distances.

Therefore a network of the above distributed nature is proposed in which an optimization of the retrieval costs can be made as a function of the local popularity of the video signals offered by the network. This known network further is hierarchical in that the intermediate layer of distributed servers is coupled to the lower layer of user stations and to an upper layer which comprises the central server. Thanks to these features the locally popular material, i.e., the second pluralities of video signals, may be stored locally whereas the full video archive, i.e., the first plurality of video signals, may be stored in a central location from which the locally popular video material of the second pluralities may then be updated dependent upon demand.

The above paper describes in particular how the video signals should preferably be distributed over the various layers but does not propose an architecture for these servers. Known architectures, for instance the one described in the paper "A store-and-forward architecture for video on demand service", by Gelman et al., ICC '91, June 1991, pp. 842–846, cannot be used for the above distributed network. Indeed, although this architecture includes a centralized information warehouse, which may be considered as a central server, connected to central offices which include service circuits dedicated to the video on demand service, the latter circuits cannot be considered as the above defined distributed servers. This is due to the presence in these service circuits of buffers which do not allow storage of a complete video signal corresponding for instance to a motion picture. Therefore the service circuits do not operate as autonomous distributed servers since for the transmission of each video signal they need to interact with the central server.

From the above it follows that the distributed servers need to be defined in more detail in order to reap the benefits of a distributed network of the above type. More particularly, the distributed servers have to be designed as a function of their location and function in the above distributed and hierarchical network and in view of both their installation and operation costs.

Disclosure of the Invention

Accordingly, an object of the present invention is to provide a network of the above type but wherein a specific architecture of the distributed servers adapted to their location and function is proposed.

This object is achieved thanks to the fact that said distributed video servers store said second plurality of video signals on random access read/write memories.

The latter memories, for instance electronic RAM-memories, magnetic or optical disks, or the like, are a cost effective means for storing a relatively large number of video signals in a relatively small space. In particular, advantage can be drawn from the research efforts made in the computer industry with regard to these types of memory. Furthermore can they be simply manipulated to adapt the second pluralities of video signals since they can be automatically uploaded and downloaded from the central server when local preferences change, being thus ideally suited for the adaptation of the above distributed network to changing requirements imposed by the various user stations.

Moreover, and in contrast with the above buffers in the service circuits of the last mentioned paper by Gelman et. al., the video signals may be flexibly assigned to the memory locations of these memories as is imperative to obtain distributed video servers having a high degree of functionality. This emerges clearly from the paper by W. Sincoskie, "System architecture for a large scale video on demand service", Computer Networks and ISDN Systems 22, 1991, pp. 155–162 wherein the copier memories perform the role of the memories used in the present distributed servers while the library subsystem corresponds to the central server.

In view of the memory hierarchy proposed in section 3.2 of the last mentioned paper by Sincoskie et. al., the invention can also be appreciated as based on the insight that the best trade-off for the distributed network consists in mapping this memory hierarchy onto the network hierarchy discussed above. Indeed, the copier memories are ideally suited for the distributed servers since these actually provide the video signals on-line to the user stations, whereas the central server should mainly consist of the library subsystem since it only has to store the full video archive in a cost effective way and to forward video signals off-line to the distributed servers.

An important feature of the present invention is that each of said video signals is stored in said random access memories as a plurality of data packets, and that said random access memories are electronically coupled to input ports of a broadband switch whose output ports are in turn coupled to said user stations and said central server.

In so doing, the distributed servers are still better adapted to their function. Indeed, the broadband switch can be used to flexibly establish connections between any of the random access memories in the distributed server and the user stations or the central server without manual intervention. These distributed, servers are thus completely automatic and autonomous modules which can moreover take advantage of the multicast properties of the broadband switch to further reduce the retrieval costs.

Another drawback of known video on demand networks is that all video signals are supposed to have a same fixed transmission rate, i.e. 1.5 Mbit/s. The problem of how to accomodate variable bitrate video signals or, for that matter, video signals with distinct fixed bitrates has hitherto never been addressed.

The latter problem is however a crucial one in the deployment of video on demand networks as it is well known in the art that, for achieving a predetermined quality level, each video signal requires a specific bitrate, optimally a variable bitrate. Providing only one fixed bitrate in the network thus results either in wasting bandwidth by providing excessive quality or in compromising quality by providing too little bandwidth.

The above problem is all the more important when the video on demand network uses a packet switching network such as e.g. an Asynchronous Transfer Mode or ATM network as backbone. Indeed, such networks are optimized for variable bitrate traffic so that optimal transmission of video signals presupposes that these video signals are encoded as variable bitrate video signals.

A further object of the present invention is to provide a network of the above type wherein a plurality of distinct transmission rates for transmission of the video signals to the user stations are allowed.

This is achieved through the following feature of the present invention, namely that predetermined ones of said data packets include timing information relating to required packet transmission rates of video signals of which they form a part, that said data packets are retrieved from said random access memories independent from said required transmission rates, and that said distributed servers also include pace control means queueing said data packets under control of said timing information in order to transmit said video signals at said required packet transmission rates.

In this way each of the distributed servers are adapted to convey a video signal to the user stations at a transmission rate defined in the video signal itself.

Advantageously this does not affect the retrieval rate at which the video signals are read from the memories as the latter would restrict the flexibility of the distributed video servers as can be verified from the discussion of the copier memories and the retrieval process associated thereto in the paper by W. Sincoskie.

Furthermore, by including the pace control means in the distributed server itself the sending of timing information over the network is avoided which again would increase the retrieval costs of the video signals. Such timing information transmission would be necessary in the architecture proposed in the paper by A. Gelman and is further undesirable as the pace control process would become complicated due to the delays incurred by the data packets in the network.

A further feature of the present invention is that each of said data packets includes timing information relating to a required transmission time of a next data packet in a same video signal, and that said pace control means compares for each said next data packet said timing information with an internal clock signal and starts transmission of said next data packet as a function of the result of said comparison.

Thanks to the above a simple and effective means for processing packet-by-packet variable bitrate signals in the video on demand network is provided.

A further feature of the present invention is that said central server includes a number of read modules smaller than a number of off-line memories on which said first plurality of video signals is stored as a plurality of said data packets and transfer means, for transferring a requested one of said off-line memories to one of said read modules, and that said read modules are electronically coupled to input ports of a second broadband switch whose output ports are in turn coupled to said distributed servers.

As already mentioned above, such an architecture of the central server is most optimal in view of its location and function in the network. Indeed, it provides cheap mass storage which is optimized for fast off-line data transfer, e.g. computer tapes, digital audio tapes, etc. Moreover, the architecture of the central server is similar to that of the distributed servers as far as the read modules and control thereof are concerned which allows the design effort for both types of server to be shared to a large extent.

Still another characteristic feature of the present invention is that said central server includes means to transmit video signals of said first plurality to said distributed servers with the purpose of adapting said second pluralities therein at a rate faster than said required transmission rates of said video signals.

In this way, and as also described in the paper by A. Gelman advantage can be taken from the fact that the video signals need not be transmitted in real-time by the central server. Such a faster than real-time transmission allows to optimize the retrieval costs from the central server to the distributed servers and may for instance be achieved by coupling the central server to the backbone network by way of Synchronous Digital Hierarchy or SDH links.

In contrast to the last mentioned paper, such fast off-line transmission does not complicate the design of the distributed servers thanks to the fact that the transition to on-line transmission in the latter server has not to be done at the same time the video signal is received and hence has not to take into account the delays incurred by the data packets of a same video signal in the backbone network.

Yet another characteristic feature of the present invention is that said distributed servers and said central server are intercoupled via a broadband backbone network, said first mentioned broadband switch being an access switch whose output ports are coupled to a broadband access network, and that said distributed server transmits said video signals in a format compatible with said broadband access network.

By positioning the distributed servers in the above way they best exploit the commonality in the preferences of user stations dependent upon their geographical location whilst the backbone network is optimized for fast and cheap transmission between the central and distributed servers.

It further emerges from the above feature that the distributed servers can be adapted to the access networks to which they are coupled. This is advantageous since a number of distinct access networks such as Passive Optical Networks PON, SDH-rings and Asynchronous Digital Subscriber Loops ADSL may be used. This feature thus also allows the network to be adapted to the various distributed servers with limited video signal storage capability which will almost certainly be implemented more rapidly than the present global video on demand network since no broadband backbone network is installed as yet.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 5:
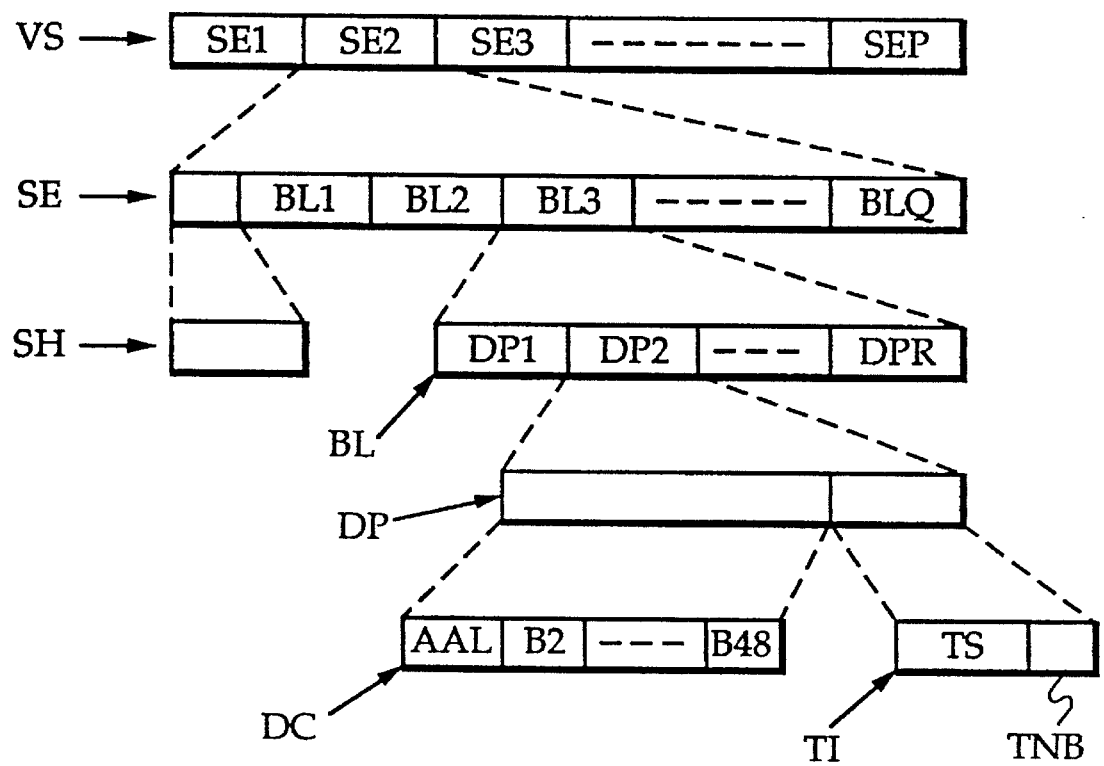
FIG. 5 shows a format in which video signals used in the network VODN are stored in memories included in the servers CS, DS1 and DS2.

The video on demand network VODN shown is used to convey video signals, stored according to the format shown in FIG. 5, from a number of video servers CS, AUX, DS1, DS2 to user stations US11, . . . , US2N upon requests issued thereby. In order to ensure an optimal operation of the network VODN a central control center CCC controls the above video servers.

The network VODN more particularly comprises a broadband backbone network BBN to which access networks AN1 and AN2 and video on demand circuits CCC, CS, AUX, DS1, DS2 and DS3 are coupled. The groups of user stations US11 to US1N and US21 to US2N are coupled to BBN via access networks AN1 and AN2 respectively.

Figure 1:
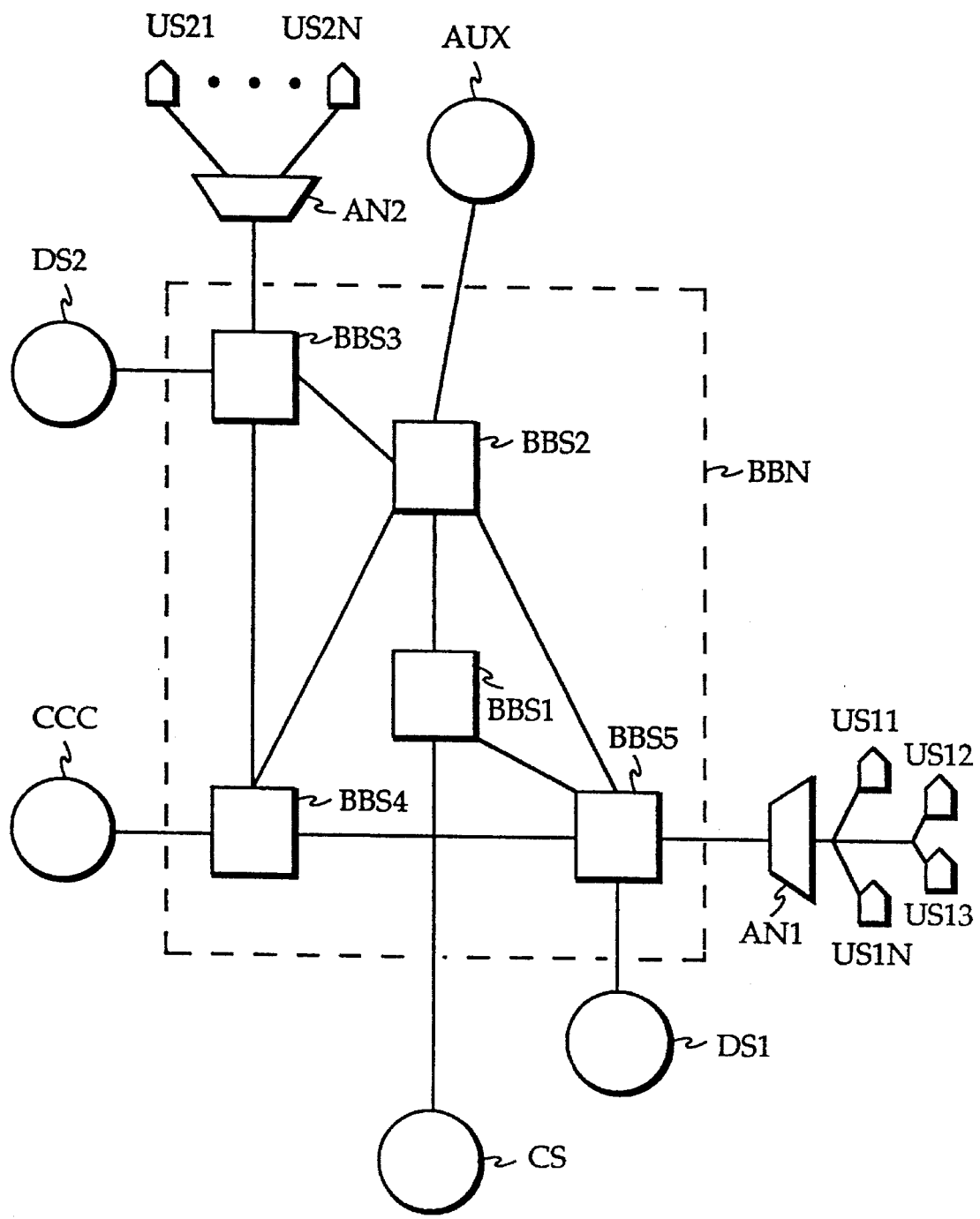
FIG. 1 shows a video on demand network VODN in accordance with the present invention.

The backbone network BBN is itself constituted by broadband packet switching networks BBS1 to BBS5 which are interconnected as shown in FIG. 1. These switching networks are all of the multipath self routing type, as described in detail in U.S. Pat. No. 5,214,639 claiming priority from International Patent Application WO/91/2420 and entitled "Communication Switching Element and Method for Transmitting Variable Length Cells", and U.S. Ser. No. 07/668, 582 that claims priority from European Patent Application EP-A 90200594.1 (Pub. No. EP 446493-A1), entitled "Routing Logic Means for a Communications Switching Element". More particularly, BBS1/2 are Synchronous Digital Hierarchy or SDH cross-connects made in accordance with the paper "Application of the multipath self-routing switch in a combined STM/ATM cross-connect system", by B. Pauwels et al., International Switching Symposium 1992, Yokohama whereas BBS3/4/5 are Asynchronous Transfer Mode or ATM switching networks. All links interconnecting one of the switching networks BBS1-5 with BBS1/2 are SDH links whereas all other links between the switching networks BBS3-5 are of the ATM type.

The access networks AN1 and AN2 are coupled to switching networks BBS5 and BBS3 respectively which are therefore also called access switching networks. AN1 is an Asynchronous Passive Optical Network APON as disclosed in the pending U.S. application Ser. No. 07/983,876 that claims priority from European Patent Application 91870197.0 and AN2 is an Asynchronous Digital Subscriber Loop ADSL access network. It is to be noted that the above mentioned access switching networks BBS3/5 switch information packets according to formats which are imposed by the access networks AN2 and AN1, respectively and which may slightly differ from the standard ATM-format.

The video on demand circuits include the central server CS, described in detail with reference to FIG. 3, the central control center CCC, an auxiliary server AUX and distributed servers DS1 and DS2, described in more detail with reference to FIG. 4. CS is coupled via Sonet/SDH-links to the SDH cross-connect BBS1, whilst CCC, DS1, DS2 and AUX are coupled to BBS4, BBS5, BBS3 and BBS2 respectively.

Before describing the operation of the network VODN, it is necessary to first discuss in more detail the architecture of the user stations which issue the requests for video signals and of the central and distributed servers which service these requests and store the video signals. This is done hereafter with reference to FIGS. 2 to 4.

Figure 2:
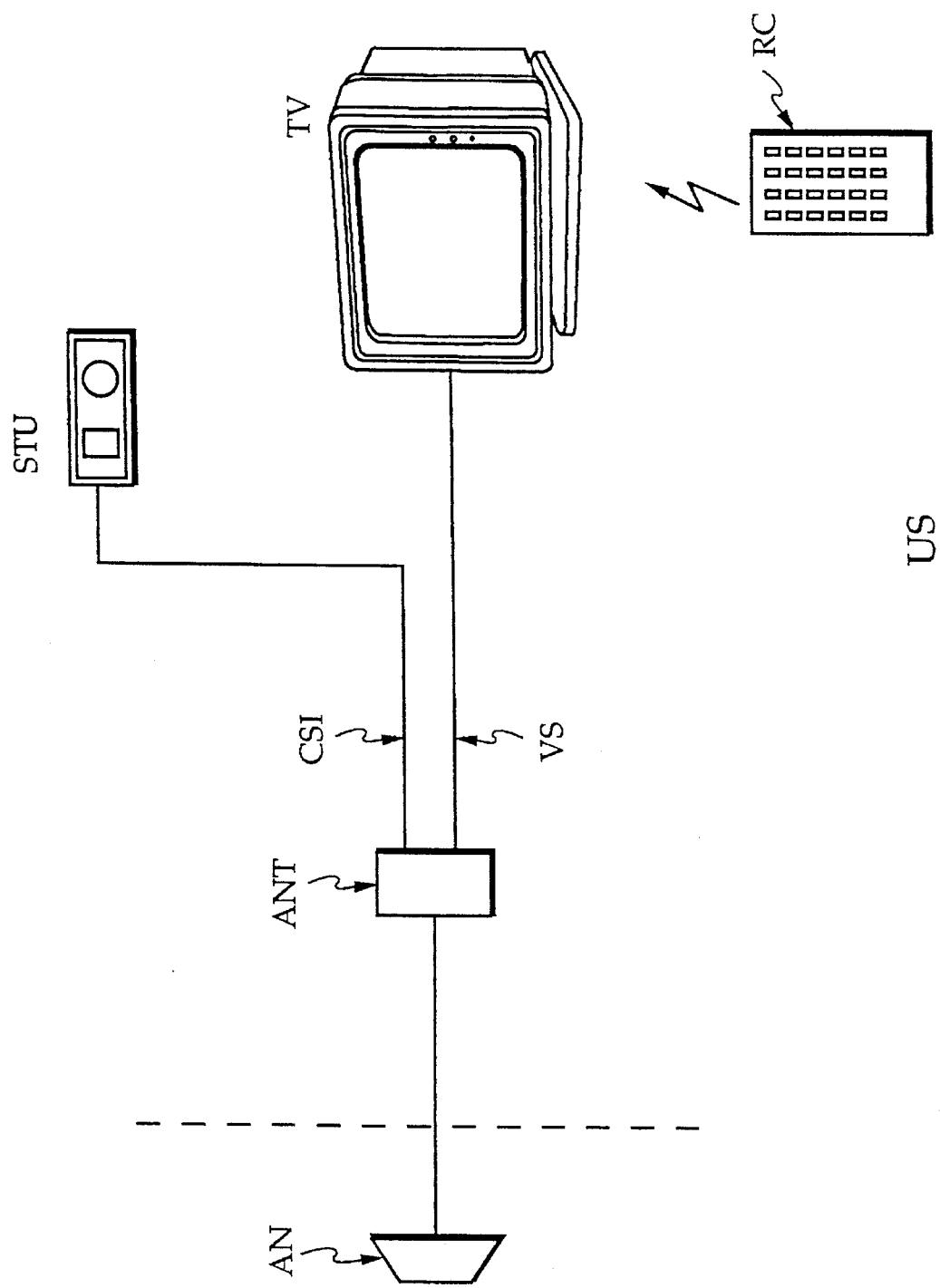
FIG. 2 represents the architecture of a user station US (US11, . . . , US2N) of the network VODN.

FIG. 2 shows the structure US of any of the user stations US11/US2N which comprise a conventional television set TV, an access network termination unit ANT coupled to an access network generally indicated by AN, a remote control unit RC and a set top unit STU. When the remote control unit RC operated by the user communicates with the set top unit STU, the latter generates a control signal CSI based on the instructions given by this user via RC and applies it to ANT. The TV set displays decoded video signals VS supplied by ANT according to a specific standard. Finally, the access network termination unit ANT is adapted to the type of access network AN coupled to US and is able on the one hand to decode the video signal applied to it by AN thereby yielding the decoded video signal VS adapted to be displayed by the television set TV and on the other hand to format the control signal CSI to enable its transmission over the access network AN.

Figure 3:
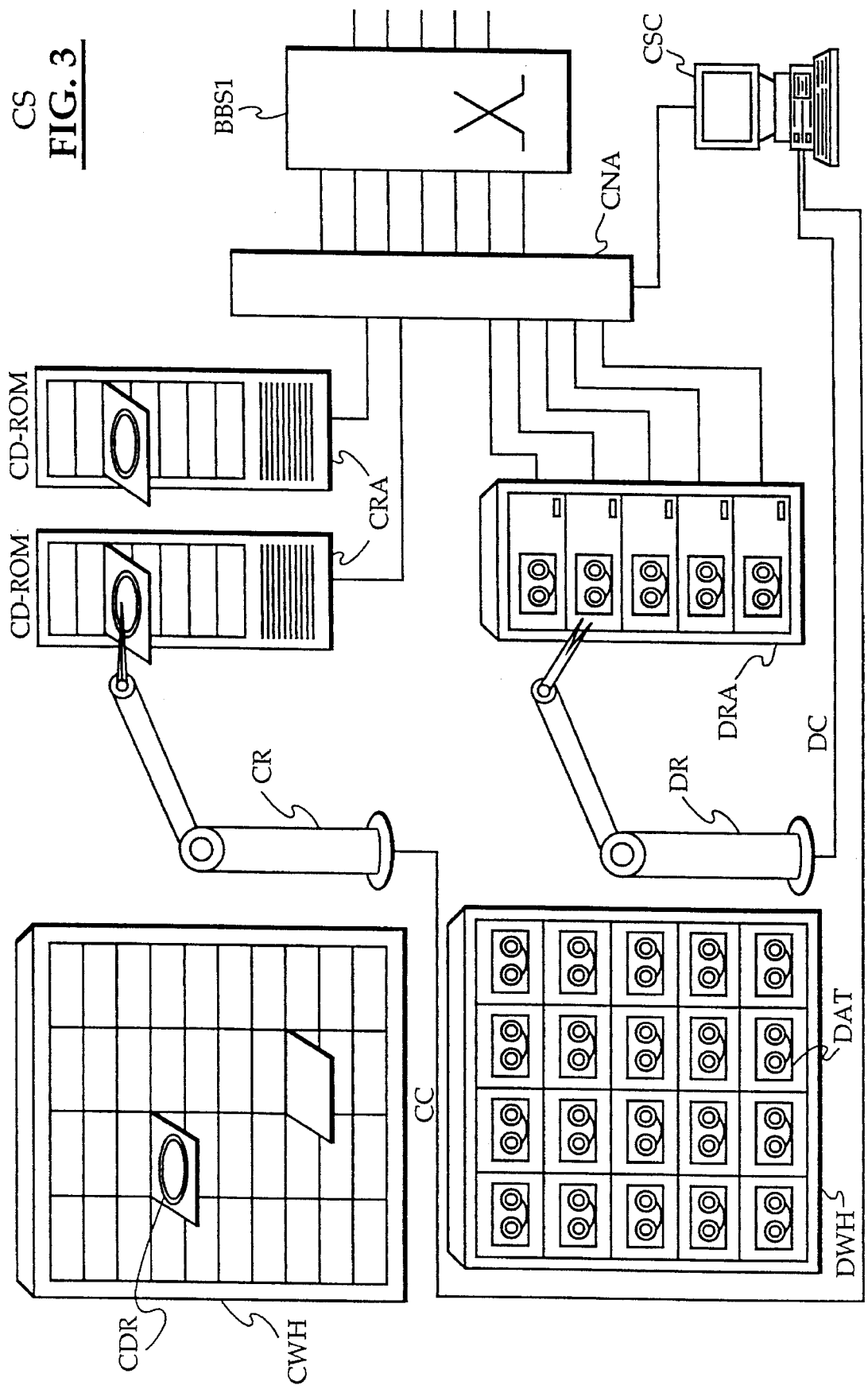
FIG. 3 shows in more detail a central server CS of the network VODN.

The central server CS depicted in FIG. 3 comprises a video library constituted by two warehouses CWH and DWH for storing distinct types of memory, i.e. Digital Audio Tapes DAT and CD-ROMs CDR respectively. On each memory of the above types a particular program, e.g. a motion picture, is stored in a digital packetized format which will be discussed in detail later with reference to FIG. 5. Also, each of the memories DAT, CDR may be transferred from the warehouses CWH, DWH in which it is stored to a respective array of read modules CRA, DRA via a respective positioning robot CR and DR. The arrays of read modules CRA, DRA are electronically coupled to the SDH (Sonet) cross-connect BBS1 via a network adapter CNA which derives Sonet/SDH-frames from the mentioned digital packetized format under which the video signals are stored on the DATs and CD-ROMs. The central server CS further includes a central server controller CSC, also coupled via the network adapter CNA to BBS1, which derives control signals DC and CC for the robots DR and CR as described further below.

Figure 4:
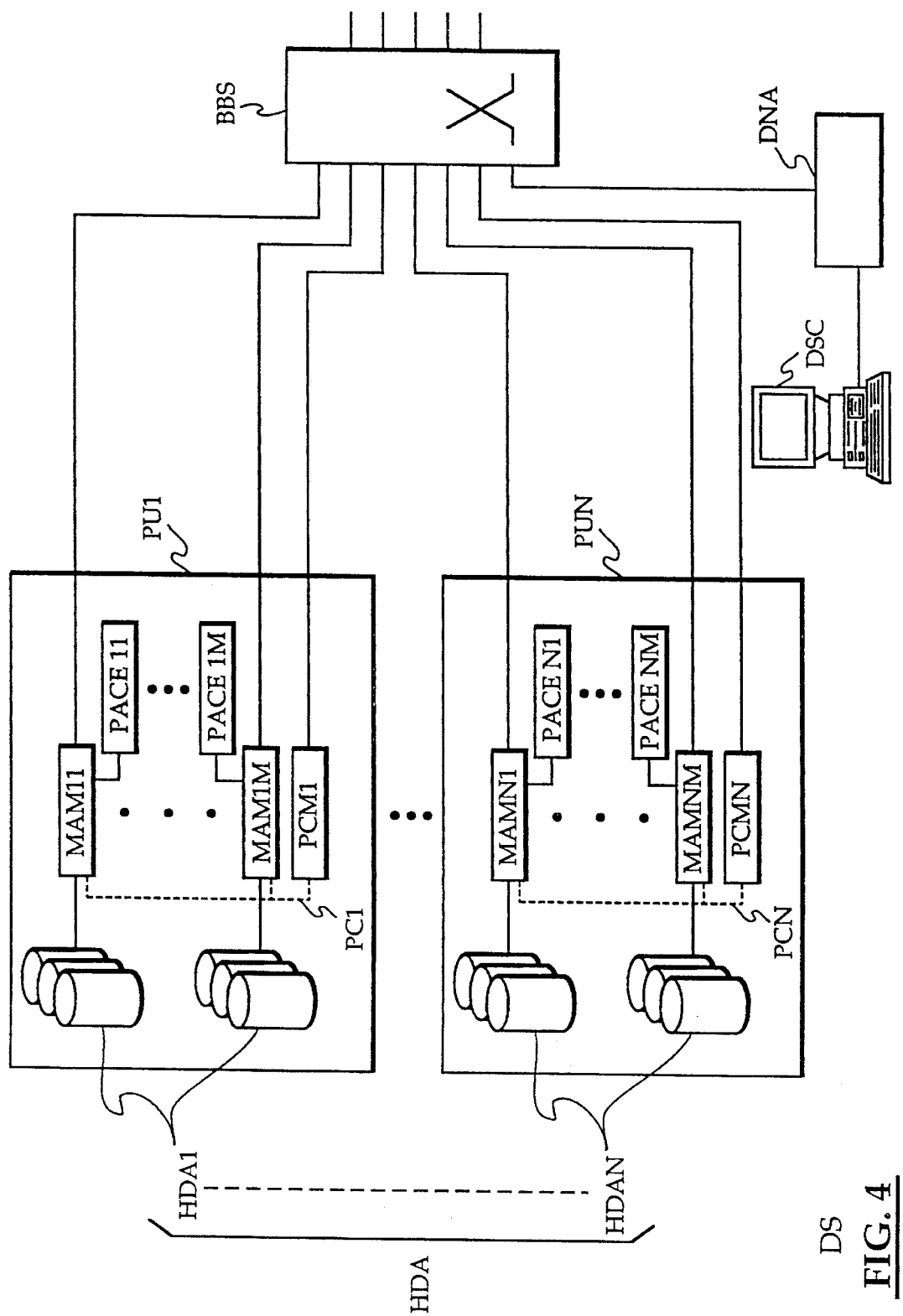
FIG. 4 represents the architecture of a distributed server DS (DS1 and DS2) of the network VODN.

The architecture DS of the distributed servers DS1 and DS2 is shown in detail in FIG. 4 and includes a plurality HDA of arrays of hard disks HDA1 to HDAN each being connected to a respective one of media adapter modules MAM11/MAMNM. From the digital packetized format mentioned above, each of these media adapter modules MAM11/MAMNM derives information packets according to the format used by the access network, i.e., AN1 and AN2 for DS1 and DS2 respectively, to which they are coupled via a broadband switching network BBS, i.e. BBS3 and BBS5 for DS1 and DS2 respectively. The distributed server DS further includes a distributed server controller DSC which is coupled to the switching network BBS via a network adapter DNA also deriving signals according to a format used by the access network AN1/2 to which it is connected.

It is to be noted that the above structure of the distributed server DS is similar to that of the above central server CS insofar the read modules CRA and DRA, the central server controller CSC and the broadband switch BBS1 are concerned. Further, the switching networks in FIGS. 3 and 4 instead of belonging to the backbone network BBN could also form part of the respective video server itself.

The architecture of the distributed server DS is further characterized by the division in N program units PU1 to PUN including respective pluralities of M media adapter modules MAM11/MAM1M to MAMN1/MAMNM and respective program control modules PCM1 to PCMN. The latter modules PCM1 to PCMN control the data transfer between the hard disk arays HDA1 to HDAN and media adapter modules MAM11/1M to MAM1M/NM of the respective program units PU1 to PUN via respective program control lines PC1 to PCN. The latter structure of DS is not mandatory for the present network VODN but is particularly advantageous in view of the performance of the distributed server DS and is therefore explained in detail in the copending U.S. application Ser. No. (Atty. Docket No. 902-316) European Patent Applications of even date entitled "Video server" in connection with FIG. 1 and the accompanying text thereof, which is hereby incorporated by reference for purposes of background. Further details of the media adapter modules (MAM) are disclosed in connection with FIGS. 2 and 3 thereof, showing also media control boards of the media adapter modules in detail, all of which is also incorporated by reference for background. Also of interest is copending U.S. patent application Ser. No. (Atty. Docket No. 902-317) based on European Patent Application 93870086.1 of even date, entitled "Video Server Memory Management Method", particularly FIGS. 1–3 thereof, beginning in the text at page 7, line 9, and continuing to page 12, line 23 thereof, which is also hereby incorporated by reference for background.

The operation of this video on demand network VODN will hereafter be described by discussing the sequence of actions needed to convey a video signal requested by one of the user stations US11, . . . , US2N thereto, e.g. US13.

Firstly, a viewer present in this user stations US13 signals via his remote control unit RC that he wants to use the video on demand service. STU converts this signal to a control signal CSI which in its turn is converted by ANT in an APON-frame and then sent to the switching network BBS5 via the APON network AN1. In BBS5, the APON-frame is switched to DS1 and more particularly to the server controller DSC of DS1. The latter server controller DSC identifies the user station US13 which issued the received frame and transmits corresponding teletext information to US13 via AN1 for instance by expanding an existing multicast tree in BBS5.

In ANT of US13 the latter teletext information is converted in the decoded video signal VS which is displayed on the television set TV. The viewer can then interactively, e.g. via known teletext techniques, make a selection among the video signals available in the network VODN. These video signals are grouped in at least two categories, i.e. a first category or plurality stored in the central server CS and a second category or pluralty stored in the distributed server DS1 itself. At least the cost of the various video signals and the waiting time expected before the video signal can be actually transmitted to US13 are also contained in the given teletext information. Further categories of video signals might be used and these categories may for instance relate to video signals which are stored in a storage layer higher than that represented by the central server CS or only locally in another distributed server, i.e., in the present case DS2, or which are multicast from the server AUX, as described later.

The resulting selection of the viewer in user station US13 is conveyed to the distributed server controller DSC of DS1 via RC and STU as already described above. The action of the latter server controller DSC depends upon the category of video signal that is requested and therefore different cases are described hereafter.

If the requested video signal belongs to the above second category, DSC controls the on-line transmission of this video signal from its memories HDA to user station US13. How this is realized is briefly discussed hereafter for the sake of clarity. A detailed description of this control and the resulitong transmission is given in the above mentioned co-pending U.S. patent application Ser. No. (Atty. Docket No. 902-316).

If the requested video signal is not yet registered for transmission, DSC activates one of the program control modules PCM1/PCMN, corresponding to the program unit PU1/PUN in which the selected video signal is stored, to produce an instance of the requested video signal together with routing control information indicative of user station US13. This routing control information is used by BBS5 and AN1 to switch the video signal to the correct user station.

On the contrary, if the requested video signal is already registered as being transmitted via BBS5 to any of the user stations US11/US2N than DSC signals to the switching network, e.g. BBS5, that it has to react differently to the routing control information which was already allocated to the mentioned requested video signal. This for instance may consist in updating the multicast trees associated to the latter routing control information in BBS5. It is to be noted in this respect that a reaction to such requests of the user stations need not necessarily be done by DSC and that an alternative solution is discussed in detail using a switching network as described in a further co-pending European Patent Application Ser. No. 93870083.8 of even date and entitled "Network for providing switched video services".

If, on the other hand, the requested video signal belongs to the above first category, the distributed server DS1 is not able to service the request on-line since it has to appeal to the central server CS to obtain a copy of the requested video signal. Again two different scenarios are considered in the following.

In a first scenario, DS1 requests CS to upload the video signal from its memories onto the hard disk arrays HDA of DS1 if memory is available therein for storing this video signal and afterwards DS1 plays back the thus stored video signal from its hard disk arrays HDA in the way described above.

The central server controller CSC upon receiving such an upload request from the distributed server controller DSC of DS1 issues control signals DC and CC corresponding to the identity of the requested video signal such that the DAT or CD-ROM on which this video signal is stored is transferred to one of the read modules of DRA or CRA. CSC then takes the same actions as previously discussed with reference to DSC in retrieving the video signal from the relevant read module and in associating routing control information, designating the program unit of DS1 on which this video signal is copied, thereto.

However, the latter transmission is not performed on-line but off-line, i.e., in the present case at a rate much higher than the transmission rate required for the display of the requested video signal. In other words, the transmission is performed much faster than real-time for instance with a transmission rate of 155 Mbit/s corresponding to one of the basic Sonet/SDH transmission rates.

In a second scenario, if no memory is available in DS1 or if it would be too expensive to copy the video signal, DS1 passes on the request of US13 to the central server CS which then controls the complete handling thereof. CS then transmits the requested video signal directly to US13 by taking essentially the same actions as described above, apart from the facts that it designates the user station US13 in the routing control information and that it forwards the video signal in real-time. How this is realized is explained in detail later with reference to the format in which the video signals are stored and which is depicted in FIG. 5.

The requested video signals may also belong to a third category, for instance of video signals which are supplied by conventional television networks. This category of video signals is transmitted on the backbone network BBN via the auxiliary server AUX, for instance located in the television network transmission center, and comprises most importantly video signals which are transmitted 'live' to the user stations US11, ..., US2N.

The auxiliary server AUX is not shown in detail but is of the same type as the other servers CS, DS1/2 forming part of the network VODN. In the auxiliary server AUX, however not only memories are connected to the switching network BBS2 but also some cameras which realize real-time digital video encoding for instance according to the format described with reference to FIG. 5 below. These programs will be typically multicast to large numbers of user stations US11/US2N and the controller for the server AUX therefore mainly reacts to new request by adapting multicast trees as described above.

The other distributed server DS2 and all other user stations of the network VODN are serviced in exactly the same way as described above with reference to US13 and AN1, except that their various adapter and termination modules need to be adapted to the ADSL-type access network AN2.

In order to realize the above various categories of video signals such that they correspond to the cheapest solution in view of the over-all retrieval costs in VODN, the latter requires some over-all control. Such control is more particularly required to adapt these categories in function of the changing requirements of the user stations, i.e. in view of the changing popularity of the video signals.

In the present network VODN this is achieved in a centralized way by the central control center CCC, for instance a large computer facility, which determines the above categories from statistical data collected by the server controllers DSC of each of the distributed servers DS1 and DS2 and regularly transmitted by the controllers DSC to CCC. These statistical data provide an insight to the viewing pattern and the popularity of the video signals as far as the user stations coupled to these servers DS1/2 are concerned.

The central control center CCC further can be used for the billing in VODN, for the preparation of the teletext information used by each of the distributed servers DS1 and DS2, etc.

Finally, with reference to FIG. 5, the format in which the video signals are stored in the memories of the various servers of VODN is discussed with reference to FIG. 5. This is primarily done in order to explain how the real-time video signals mentioned above are generated based on this format. Aspects of this format which are not linked directly with the above timing requirements are discussed in detail in the first mentioned co-pending patent application having U.S. Ser. No. (Atty. Docket No. 902-316) in connection with FIG. 4 thereof, which is hereby incorporated by reference for background.

FIG. 5 hereof also shows in detail the format of the digital video signals available in the network VODN shown in the just-mentioned copending patent application. These digital signals are obtained by the coding method proposed by the Moving Pictures Expert Group MPEG and standardized by the International Standards Organisation ISO. This coding method aims at a transmission rate at up to about 1.5 Mbit/s but can also be used for other coding rates, e.g., 4 Mbit/s, which can already be achieved with state of the art technology.

To obtain the format shown in FIG. 5, the bitstream resulting from the above MPEG coding method is further coded according to a proprietary code, e.g., a Reed-Solomon code. Each set of 47 consecutive bytes B2-48 of the thus obtained bitstream together with an ATM Adaptation Layer byte AAL constitute the payload DC of a data packet DP which further includes timing information TI consisting of a time stamp TS and a transfer next block bit TNB. A number R of data packets DP1, ..., DPR constitute a block BL and a number Q of these blocks BL1, ..., BLQ together with a segment header SH form a segment SE. Finally a video signal VS consists of P segments SE1, ..., SEP with P being a function of the length of the video signal VS.

Each video signal VS of the above type is retrieved by the media adapter modules MAM11/MAMNM from the hard disk arrays HDA1/HDAN on a block by block basis. Each block BL is moreover retrieved at the maximum retrieval rate, i.e. 10 Mbyte/s as imposed by buses (not shown) according to the well known Small Computer Interface standard SCSI-2 and connecting each up to 7 distinct hard disks of the hard disk arrays HDA1/HDAN to the media adapter modules MAM11/MAMNM as can be verified from the first mentioned co-pending application U.S. Ser. No. (Atty. Docket No. 902-316).

However, this rate is much higher than real-time and therefore unsuitable for on-line transmission to the user stations US11/US2N as it is incompatible with the latter stations. Therefore a conversion of transmission rate has to be done before transmission of the block BL on the network VODN. This conversion operation is performed on the basis of the timing information TI included in each data packet DP and more particularly on the basis of the time stamp TS included therein.

The conversion operation is performed in a pace control circuit shown generally in FIG. 4, which may be associated with each of the above-mentioned media control boards included in each of the media adapter modules MAM11, ..., MAMNM. The pace control circuit more particularly includes a buffer for queueing the block BL upon it being retrieved, an internal timer and a comparator for comparing the time stamp TS with the value output by the internal timer.

The pace control circuit operates as follows: upon sending a data packet DP from the block BL it stores the time stamp TS included in this data packet DP and starts comparing the value of this time stamp TS with the value of the internal timer. If the result of this comparison is within a certain threshold range, the pace control circuit retrieves a next data packet DP from the buffer reiterating the above procedure. It is clear that in the above way packet-by-packet variable bitrate video signals VS can be supported since each data packet defines the transmission instant of the following data packet.

Finally, it is to be noted that the time stamps TS may be used in the read modules DRA and CRA of the central server CS in a similar way requiring adaptations to the pace control circuit well within the capabilities of a skilled person.

While the principles of the invention have been described above in connection with specific apparatus, it is to be clearly understood that this description is made only by way of example and not as a limitation on the scope of the invention. Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Video on demand network for transmitting video signals to user stations and including at least one central video server for storing a first plurality of video signals, and a plurality of distributed video servers each for storing a second plurality of video signals and for transmitting video signals of said second plurality to said user stations in response to control signals provided by said user stations, said central server for transmitting video signals of said first plurality to said distributed video servers in order to adapt said second pluralities based on said control signals, wherein said distributed video servers include random access read/write memories for storing said second pluralities as pluralities of data packets, wherein predetermined ones of said data packets include timing information relating to required packet transmission rates of video signals of which they form a part, wherein said data packets are retrieved from said random access memories independent from said required transmission rates, and wherein said distributed servers also include pace control means for queuing said data packets under control of said timing information in order to transmit said video signals at said required packet transmission rates.

2. Video on demand network according to claim 3, wherein said random access memories are electronically coupled to input ports of a broadband switch having output ports that are in turn coupled to said user stations and said central server.

3. Video on demand network according to claim 1, wherein said timing information contained in one of said data packets indicates the required transmission rate of subsequent data packets of a same video signal.

4. Video on demand network according to claim 1, wherein each of said data packets includes timing information relating to a required transmission time of a next data packet in a same video signal, and wherein said pace control means compares for each said next data packet said timing information with an internal clock signal and starts transmission of said next data packet as a function of said comparison.

5. Video on demand network according to claim 1, wherein each of said distributed servers also includes control means which controls retrieval of data packets from said random access memories based on receipt of said control signals and which also associates routing control information indicative of one of said user stations to each of said data packets.

6. Video on demand network according to claim 1, wherein said central server includes means for transmitting video signals of said first plurality to said distributed servers for adapting said second pluralities therein at a rate faster than required packet transmission rates of said video signals.

7. Video on demand network according to claim 2, wherein said distributed servers and said central server are intercoupled via a broadband backbone network, said broadband switch being an access switch having output ports coupled to a broadband access network, and wherein said distributed server transmits said video signals in a format compatible with said broadband access network.

8. Video on demand network according to claim 7, wherein said network further comprises a central control center for determining contents of said second pluralities based on statistics derived from said control signals by said distributed servers and wherein said central control center controls said central and distributed servers accordingly.

9. Video on demand network for transmitting video signals to user stations and including at least one central video server for storing a first plurality of video signals, and a plurality of distributed video servers each for storing a second plurality of video signals and for transmitting video signals of said second plurality to said user stations in response to control signals provided by said user stations, said central server for transmitting video signals of said first plurality to said distributed video servers in order to adapt said second pluralities based on said control signals, wherein said distributed video servers include random access read/write memories for storing said second pluralities as pluralities of data packets, wherein said central server includes a number of read modules smaller than a number of off-line memories on which said first plurality of video signals is stored as a plurality of said data packets and transfer means for transferring a requested video signal of one said off-line memories to one of said read modules, and that said read modules are electronically coupled to input ports of a broadband switch having output ports coupled to said distributed servers.

10. Video on demand network according to claim 9, wherein said central server includes means for transmitting video signals of said first plurality to said distributed servers for adapting said second pluralities therein at a rate faster than said required transmission rates of said video signals.

11. Video on demand network according to claim 9, wherein said distributed servers and said central server are intercoupled via a broadband backbone network, said first broadband switch being an access switch having output ports coupled to a broadband access network, and wherein said distributed server transmits said video signals in a format compatible with said broadband access network.

12. Video on demand network according to claim 9, wherein said random access memories are electronically coupled to input ports of a broadband switch having output ports that are in turn coupled to said user stations and said central server.

13. Video on demand network according to claim 9, wherein each of said distributed servers also includes control means which controls retrieval of data packets from said random access memories based on receipt of said control signals and which also associates routing control information indicative of one of said user stations to each of said data packets.

* * * * *